United States Patent
Zhang et al.

(10) Patent No.: US 8,047,698 B2
(45) Date of Patent: Nov. 1, 2011

(54) LIGHT GUIDE PLATES AND BACKLIGHT MODULE

(75) Inventors: He Zhang, Beijing (CN); Jun Zhu, Beijing (CN); Qiao-Feng Tan, Beijing (CN); Guo-Fan Jin, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 280 days.

(21) Appl. No.: 12/550,711

(22) Filed: Aug. 31, 2009

(65) Prior Publication Data
US 2010/0142224 A1 Jun. 10, 2010

(30) Foreign Application Priority Data
Dec. 5, 2008 (CN) .......................... 2008 1 0218231

(51) Int. Cl.
*F21V 7/22* (2006.01)
*F21S 8/10* (2006.01)

(52) U.S. Cl. ........ 362/615; 362/617; 362/623; 362/624; 362/625; 362/330

(58) Field of Classification Search .................. 362/615, 362/617, 623, 624, 625, 626, 330
See application file for complete search history.

(56) References Cited

U.S. PATENT DOCUMENTS

| | | | |
|---|---|---|---|
| 5,390,436 A * | 2/1995 | Ashall | 40/546 |
| 5,921,651 A * | 7/1999 | Ishikawa | 362/624 |
| 7,160,016 B2 * | 1/2007 | Yu et al. | 362/620 |
| 2003/0137824 A1 | 7/2003 | Shinohara et al. | |
| 2004/0114069 A1 * | 6/2004 | Lai | 349/65 |
| 2009/0207631 A1 * | 8/2009 | Isoda | 362/619 |

FOREIGN PATENT DOCUMENTS
CN 1434336 8/2003
JP H11-232918 8/1999

* cited by examiner

*Primary Examiner* — Stephen F Husar
*Assistant Examiner* — James Cranson, Jr.
(74) *Attorney, Agent, or Firm* — Altis Law Group, Inc.

(57) ABSTRACT

A light guide plate includes a light discharge surface, a light diffusing surface, a light incident surface, and a plurality of scattering dots. The light diffusing surface is located opposite to the light discharge surface. The light diffusing surface has a first part and a second part. The first part is adjacent to a light source. The light incident surface intersects with the light discharge surface and the light diffusing surface. The scattering dots within the first part are arranged in the form of a plurality of concentric arcs, and the scattering dots within the second part are arranged in the form of a plurality of lines.

20 Claims, 7 Drawing Sheets

LIGHT GUIDE PLATES AND BACKLIGHT MODULE

BACKGROUND

1. Technical Field

The present disclosure relates to light guide plates and backlight modules.

2. Description of Related Art

Currently, because liquid crystal displays (LCDs) are thin, lightweight, long lasting, and consume little power, they are widely used in a variety of electronic devices, such as digital cameras, video cameras, and personal digital assistants. However, since liquid crystal displays are not self-luminescent, backlight modules are typically required. A backlight module typically includes a light source and a light guide plate having a light incident surface and a light discharge surface. The light guide plate functions to change a direction of light beams emitted from the light source and introduced into the light guide plate. That is, the light beam is guided in a direction that is substantially parallel to the light discharge surface of the light guide plate to being perpendicular to the light discharge surface. That is, the light guide plate effectively changes the linear or point light source into a surface light source.

Referring to FIGS. 6 and 7, a typical light guide plate 10 includes a light incident surface 11, a light discharge surface 12 and a light diffusing surface 13. The light discharge surface 12 intersects with the light incident surface 11 and is substantially perpendicular to the light incident surface 11. The light diffusing surface 13 is opposite to the light discharge surface 12. At least one side of the light incident surface 11 is connected the light diffusing surface 13 and the light discharge surface 12. A plurality of scattering dots 130 is disposed on the light diffusing surface 13. The scattering dots 130 are arranged on the light diffusing surface and evenly spaced from each other. When beams emitted from a light source arrive at the scattering dots 130, a direction of the beams will change because of reflection and diffusion, and the beams will be output in a direction that is perpendicular to the light discharge surface 12. However, as the propagating distance of the light beam from the light source to the respective scattering dots of the light guide plate differs, the brightness of the light beams discharged from the light discharge surface 12 is affected with respect to the propagating distance of the light beams, thereby causing non-uniform brightness overall of the backlight module.

What is needed, therefore, is to provide a light guide plate and a backlight module using the same that have an improved uniformity of brightness.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

Figure 1:
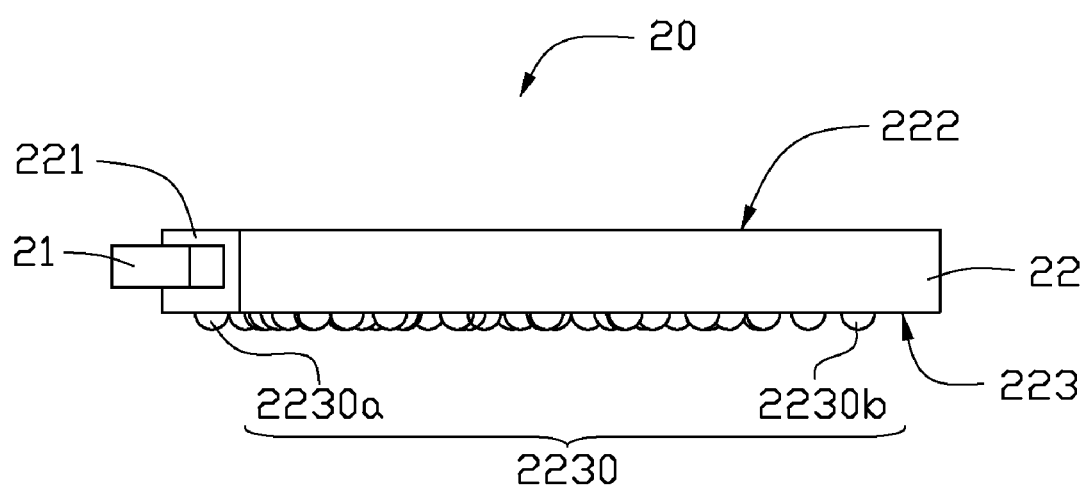
FIG. 1 is a cross-sectional view of a first embodiment of a backlight module.

Corresponding reference characters indicate corresponding parts throughout the several views. The exemplifications set out herein illustrate at least one embodiment of the present light guide plate and backlight module, in at least one form, and such exemplifications are not to be construed as limiting the scope of the disclosure in any manner.

DETAILED DESCRIPTION

Figure 2:
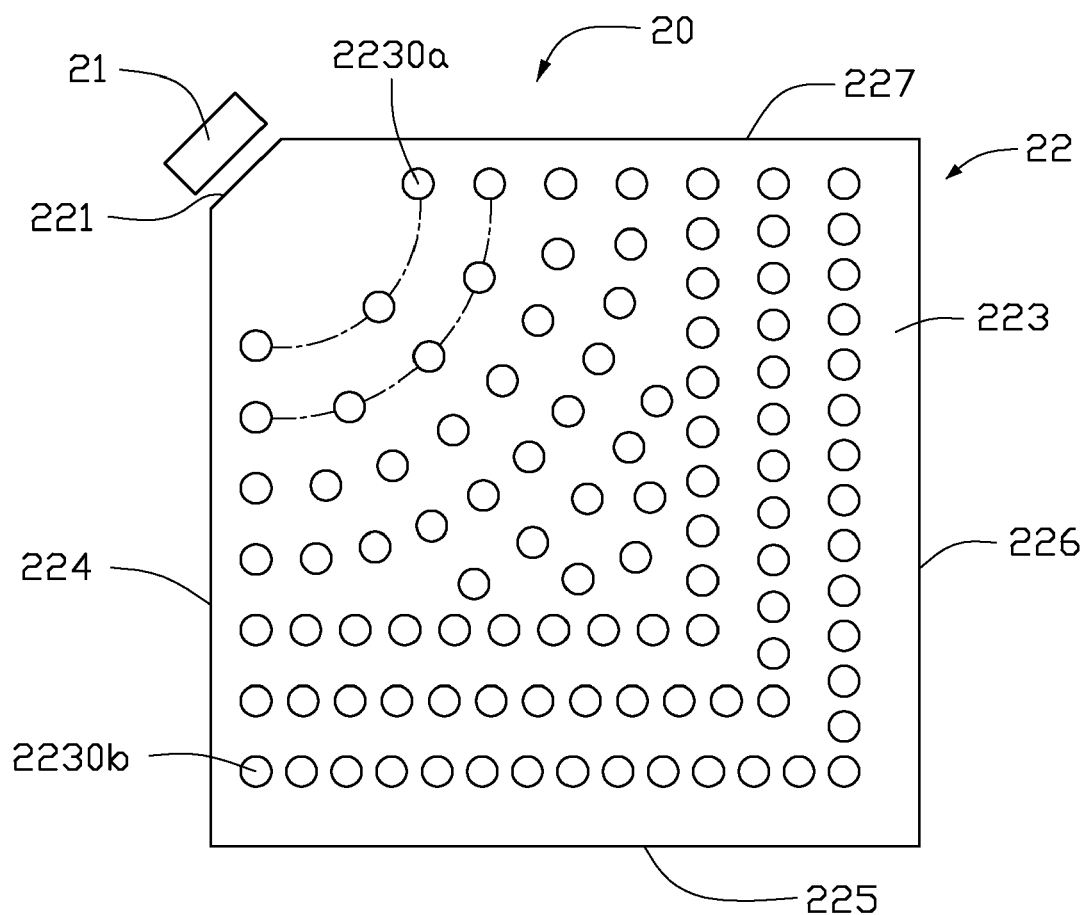
FIG. 2 is a schematic bottom view of the light guide plate used in the backlight module of FIG. 1.

Referring to FIG. 1 and FIG. 2, a first embodiment of a backlight module 20 includes a light source 21 and a light guide plate 22. The light source 21 is located beside the light guide plate 22.

The light source 21 can be a point light source or a linear light source. In the present embodiment, the light source 21 is a light-emitting diode (LED) point light source.

The light guide plate 22 can be planar-shaped or wedged-shaped. The light guide plate 22 can be made of polycarbonate (PC), polymethyl methacrylate (PMMA), polyethylene, or glass. A thickness of the light guide plate 22 is arbitrary, and can be selected according to demand. In the present embodiment, the light guide plate 22 is planar-shaped. The light guide plate 22 is made by cutting a corner part of a cuboid plate made of PMMA. The top view of the corner part, which is cut down, is an isosceles triangle. The light guide plate 22 includes a light incident surface 221, a light discharge surface 222, and a light diffusing surface 223. The light discharge surface 222 intersects with the light incident surface 221 and is substantially perpendicular to the light incident surface 221. The light diffusing surface 223 intersects with the light incident surface 221 and is opposite to the light discharge surface 222. In the present embodiment, the light incident surface 221 is a cutting surface formed by cutting the corner part of the cuboid plate. The light source 21 is adjacent to the light incident surface 221. The light guide plate 22 further includes four side surfaces: a first side surface 224, a second side surface 225, a third side surface 226, and a fourth side surface 227. The four side surfaces all intersect with the light discharge surface 222 and light diffusing surface 223. The first side surface 224 and the fourth side surface 227 both intersect the light incident surface 221. The second side surface 225 intersects with the first side surface 224 and the third side surface 226. The third side surface 226 intersects with the second side surface 225, and the fourth side surface 227. The first side surface 224, the second side surface 225, the third side surface 226, and the fourth side surface intersect the light diffusing surface 223 form a first side line (not labeled), a second side line (not labeled), a third side line (not labeled) and a fourth side line (not labeled) in that order.

A plurality of scattering dots 2230 is located on the light diffusing surface 223 of the light guide plate 22. The scattering dots 2230 can be, for example, hemispherical, V-shaped, or U-shaped. The scattering dots 2230 can be formed as protrusions on or recessed in the light diffusing surface 223. The scattering dots 2230 may be different from each other in size and shape. In the present embodiment, the scattering dots 2230 are all hemispherical, substantially the same size, and formed as protrusions on the light diffusing surface 223. The light diffusing surface 223 is divided into a first part and a second part by the scattering dots 2230. The first part is disposed between the light incident surface 221 and the second part. The first part includes a number of scattering dots 2230a, and the second part includes a number of scattering dots 2230b.

The scattering dots 2230a are disposed near the light incident surface 221. The scattering dots 2230a are arranged in the form of a number of concentric arcs around the light source 21. All the concentric arcs are open toward the light source 21 and the light incident surface 221. The arcs are arranged uniformly on the light diffusing surface 223. The scattering dots 2230a along each arc are arranged uniformly, and a distance between every two adjacent scattering dots 2230a is in a range from about 0.1 micrometer (μm) to about 1 millimeter (mm). The distances between every two adjacent arcs are equal, and ranges from about 0.5 mm to about 2 mm. A density of the scattering dots 2230a along each arc is changed according to the distance between the arc and the light source 21. The greater the distance, the higher the density.

The scattering dots 2230b are disposed far away from the light incident surface 221. The scattering dots 2230b are disposed near the second side line or the third side line. The scattering dots 2230b are arranged on the light diffusing surface 223 in the form of a plurality of lines. In the present embodiment, the scattering dots 2230b are arranged on the light diffusing surface 223 in the form of a plurality of "L"shapes. Every "L"shape has a first side line and a second side line. The first side line is substantially parallel with the second side surface 225, and the second side line is substantially parallel with the third side surface 226. Every "L"shape has a vertex. A connecting line drawn between vertexes of these right-angles would be substantially a beeline. The beeline corresponds to a diagonal of the light diffusing surface 223. The scattering dots 2230b of each "L"shape are disposed uniformly, and a distance between every two adjacent scattering dots 2230b is in a range from about 0.1 m to about 1 mm. The distances between every two "L"shapes are equal, and range from about 0.5 mm to about 2 mm. A density of the scattering dots of each "L"shape varies according to the distance between the "L"shape and the light source 21. The greater the distance, the higher the density of the scattering dots 2230b. Dimensions of the scattering dots 2230a are uniform.

The light guide plate 22 can further include a light-reflective film (not shown) disposed on the inner surface of the light diffusing surface 223. The light guide plate 22 can include a light-reflective film located on the inner surface of the first side surface 224, the second side surface 225, the third side surface 226, or the fourth side surface 227. The light-reflective film can be made of reflective material. The reflective material can be selected according to desired reflective efficiency, such as that of aluminum film or silver film.

In use of the backlight module 10, light beams radiated from the light source 21 pass through the light incidence surface 221 and enter into the light guide plate 22. Part of the light beams arrive at the scattering dots 2230 on the light diffusing surface 223 directly, and the other part of the light beams are reflected by the light discharge surface 222, and then arrive at the scattering dots 2230. The light beams in the light guide plate 22 are reflected between the light discharge surface 222 and the light diffusing surface 223 until they exit the light guide plate 22. Since the scattering dots 2230a adjacent to the light source 21 are arranged in a plurality of concentric arcs, and the scattering dots 2230b are far away from the light source 21 arranged in a plurality "L"shapes, the scattering dots 2230 are arranged according to the shape of the light guide plate 22, and the scattering dots 2230 can scatter the light beams to planar light uniformly discharged from the light discharge surface 222. Thus, the uniformity of illumination of the backlight module 10 can be improved.

Figure 3:
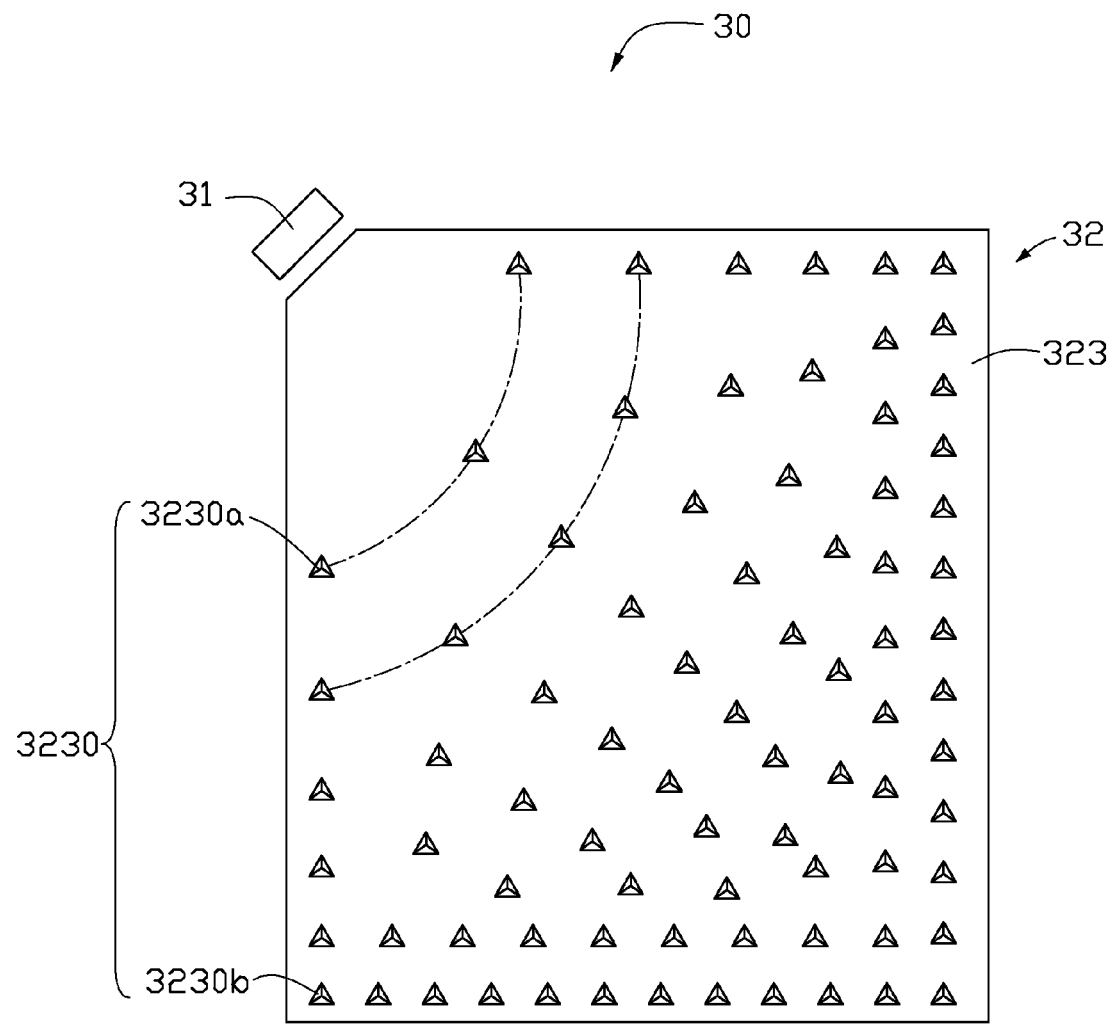
FIG. 3 is a schematic bottom view of a second embodiment of a light guide plate.

Referring to FIG. 3, a second embodiment of a backlight module 30 includes a light source 31 and a light guide plate 32. The light guide plate 32 includes a light diffusing surface 323. The structures of the backlight module 30 are the same as the first embodiment of the backlight module 20 except for scattering dots 3230. In the present embodiment, the scattering dots 3230 are V-shaped and protrude from the light diffusing surface 323. The scattering dots 3230 include scattering dots 3230a arranged in a plurality of concentric arcs and 3230b arranged in a plurality of "L"shapes. The arrangement of the scattering dots 3230 are the same as the arrangement 2230 disclosed in the first embodiment. A dimension of the scattering dots 3230a or 3230b can be changed in order to ensure uniform light output of the light guide plate 32. The scattering dots 3230a along each arc can be arranged arbitrarily. The scattering dots 3230b of each "L"shape are arranged arbitrarily. The other characters of the scattering dots 3230 are the same as the first embodiment.

Figure 4:
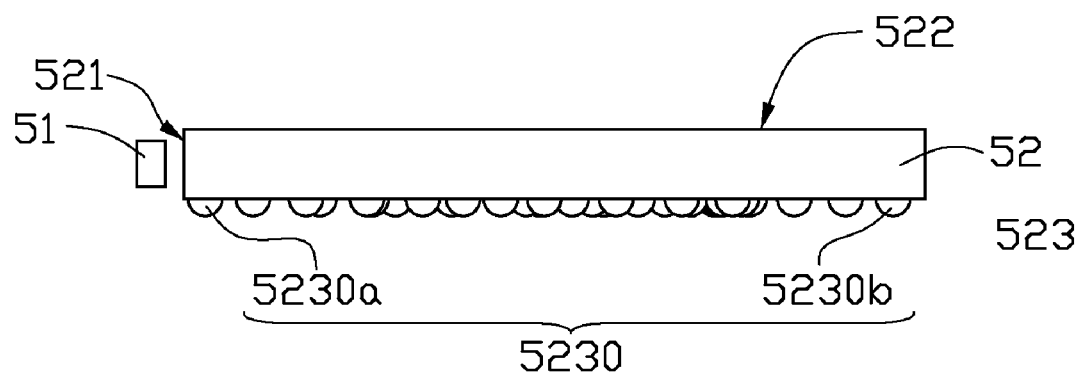
FIG. 4 is a cross-sectional view of a third embodiment of a backlight module.
Figure 5:
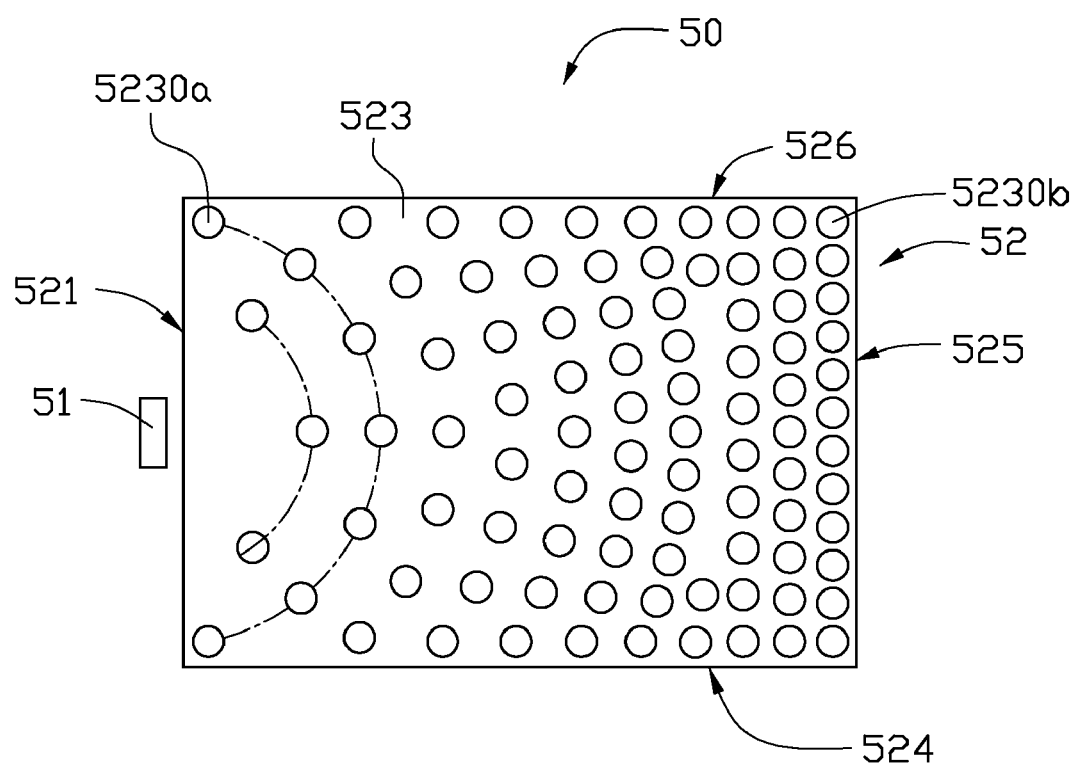
FIG. 5 is a schematic bottom view of the light guide plate used in the backlight module of FIG. 4.
Figure 6:
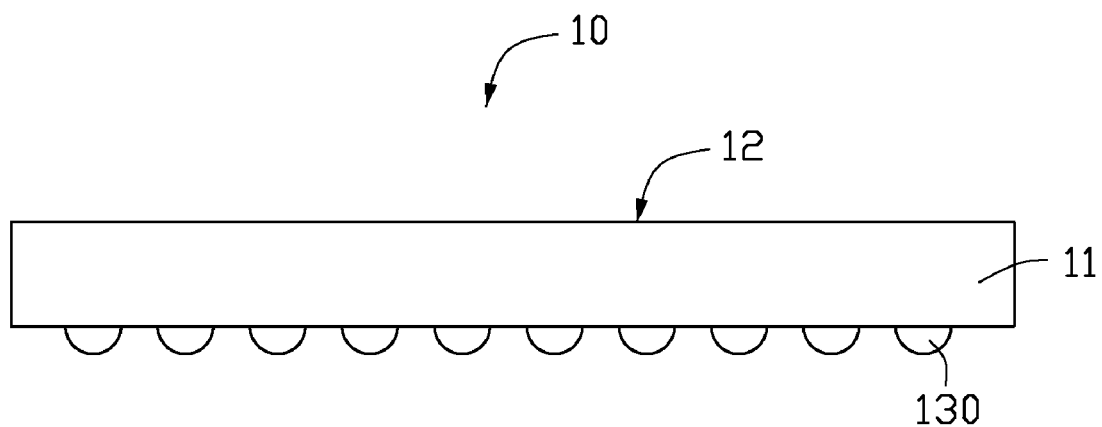
FIG. 6 is a cross-sectional view of a typical light guide plate.
Figure 7:
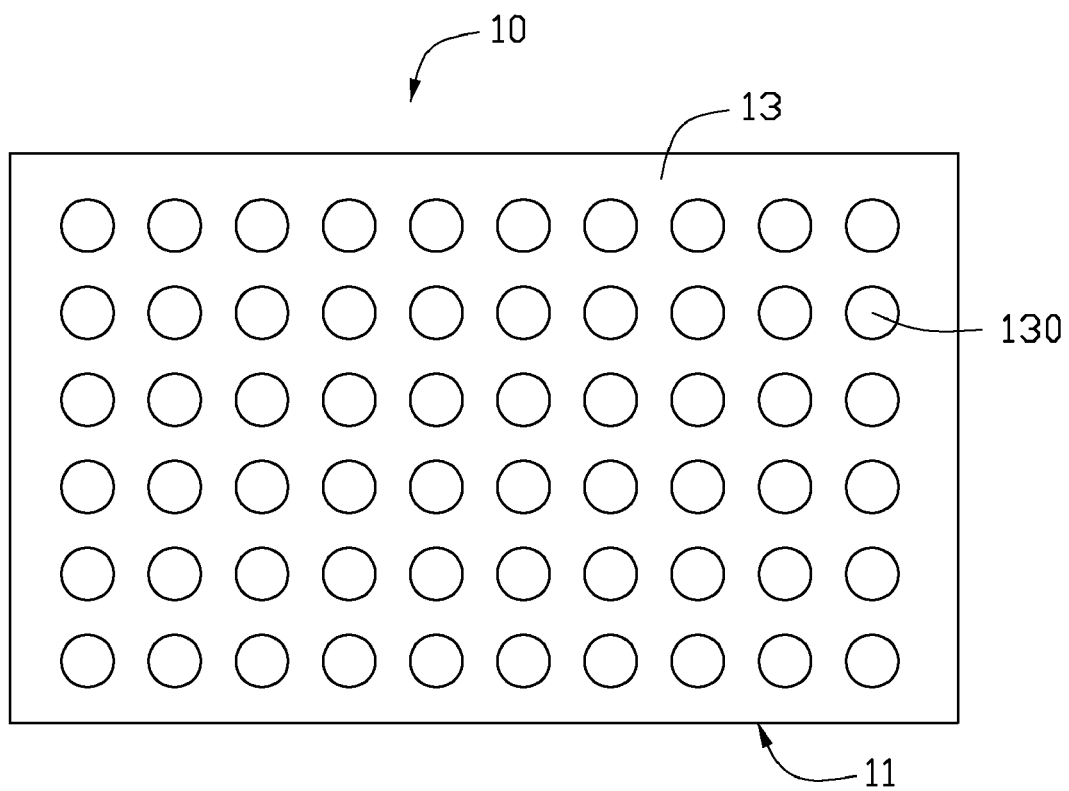
FIG. 7 is a bottom view of the typical light guide plate in FIG. 7.

Referring to FIG. 4, a third embodiment of a backlight module 50 includes a light source 51 and a light guide plate 52. The light guide plate 52 is a cuboid plate made of PMMA.

The light guide plate 52 includes a light incident surface 521, a light discharge surface 522, and a light diffusing surface 523. The light discharge surface 522 intersects with the light incident surface 521 and is substantially perpendicular to the light incident surface 521. The light diffusing surface 523 intersects with the light incident surface 521 and is opposite to the light discharge surface 522. In the present embodiment, the light incident surface 521 is a side surface of the light guide plate 52. The light source 51 is particularly positioned adjacent the light incident surface 521. The light guide plate 52 further includes three other side surfaces: a first side surface 524, a second side surface 525, and a third side surface 526. The three side surface all intersect with the light discharge surface 522 and the light diffusing surface 523. The first side surface 524 and the third side surface 526 both intersect the light incident surface 521.

A plurality of scattering dots 5230 is located on the light diffusing surface 523 of the light guide plate 52. The scattering dots 5230 include scattering dots 5230a and scattering dots 5230b. The light diffusing surface 523 is divided into a first part and a second part by the scattering dots 5230. The first part of the light diffusing surface 523 is disposed between the light incident surface 521 and the second part of the light diffusing surface 523. The first part includes a plurality of scattering dots 5230a, and the second part includes a plurality of scattering dots 5230b.

The scattering dots 5230a are disposed near the light incident surface 521. The scattering dots 5230a are arranged in the form of a plurality of concentric arcs around the light source 51. These concentric arcs are open towards the light source 51. Other properties of the scattering dots 5230a are the same as the scattering dots 2230a disclosed in the first embodiment.

The scattering dots 5230b are disposed far away from the light incident surface 521. The scattering dots 5230b are arranged on the light diffusing surface 523 in the form of a plurality of lines substantially parallel with each other. These lines are substantially parallel with the second side surface 525. The scattering dots 5230b on each line are disposed uniformly, and a distance between every two adjacent scattering dots 5230b is in a range from about 0.1 μm to about 1 mm. A density of the scattering dots on each line is changed according to the distance between the line and the light source 51. The larger the distance, the higher the density. A density of the line is changed according to the distance between the line and the second surface 325. The smaller the distance, the higher the density. A size of the scattering dot 5230b can be changed in order to ensure uniform light output the light guide plate 52.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A light guide plate, comprising:
   a light discharge surface;
   a light diffusing surface positioned opposite to the light discharge surface, the light diffusing surface having a first part adjacent to a light source and a second part;
   a light incident surface intersecting with the light discharge surface and the light diffusing surface; and
   a plurality of scattering dots disposed on the light diffusing surface, the scattering dots within the first part are arranged in the form of a plurality of concentric arcs, and the scattering dots within the second part are arranged in the form of a plurality of lines.

2. The light guide plate as claimed in claim 1, wherein the concentric arcs have a center where the light source is located and open towards the light incident surface.

3. The light guide plate as claimed in claim 1, wherein adjacent concentric arcs have a substantially equal distance from each other.

4. The light guide plate as claimed in claim 3, wherein the distance between every two adjacent arcs is in a range from about 0.5 mm to about 2 mm.

5. The light guide plate as claimed in claim 1, wherein the scattering dots on each concentric arc are uniformly dispersed.

6. The light guide plate as claimed in claim 5, wherein a distance between any two adjacent scattering dots on each concentric arc is in a range from about 0.1 µm to about 1 mm.

7. The light guide plate as claimed in claim 1, wherein a density of the scattering dots on each line is positively proportional to a distance from the light source.

8. The light guide plate as claimed in claim 1, wherein the lines have a substantially equal distance from each other.

9. The light guide plate as claimed in claim 8, wherein the distance between every two adjacent lines is in a range from about 0.5 mm to about 2 mm.

10. The light guide plate as claimed in claim 1, wherein the scattering dots on each line are uniformly dispersed.

11. The light guide plate as claimed in claim 10, wherein a distance between any two adjacent lines is in a range from about 0.1 µm to about 1 mm.

12. The light guide plate as claimed in claim 1, further comprising a plurality of side surfaces intersecting with the light discharge surface and the light diffusing surface.

13. The light guide plate as claimed in claim 12, wherein each line is substantially parallel to one of the side surfaces.

14. The light guide plate as claimed in claim 12, wherein any two lines are crossed to form a "∟"-like shape, one line in the "∟"-like shape is substantially parallel to one of the side surfaces and another line in the "∟"like shape is substantially parallel to another one of the side surfaces.

15. The light guide plate as claimed in claim 14, wherein any two lines that are crossed define a point; the points are connected in a beeline.

16. The light guide plate as claimed in claim 15, wherein the beeline corresponds to a diagonal of the light diffusing surface.

17. A backlight module, comprising:
   a light guide plate and a light source located beside the light guide plate, the light guide plate comprising:
   a light discharge surface;
   a light diffusing surface positioned opposite to the light discharge surface;
   a light incident surface intersecting with the light discharge surface and the light diffusing surface; and
   a plurality of scattering dots disposed on the light diffusing surface and dividing the light diffusing surface into a first part and a second part, wherein the first part is disposed between the light incident surface and the second part; the scattering dots in the first part are arranged in the form of a plurality of concentric arcs; the scattering dots in the second part are arranged in the form of a plurality of lines.

18. The light guide plate as claimed in claim 17, wherein the light guide plate further comprises a first side surface, a second light surface, a third light surface, and a fourth surface; the first side surface, the second light surface, the third light surface, and the fourth surface all intersect with the light discharge surface; the light diffusing surface, the first side surface, and the fourth side surface intersect with the light incident surface.

19. The light guide plate as claimed in claim 18, wherein any two lines are crossed to form a "∟"shape, each "∟"shape has a first side line substantially parallel to the second side surface and a second side line substantially parallel to the third side surface.

20. A backlight module, comprising:
   a light source; and
   a light guide plate comprising:
   a light discharge surface;
   a light diffusing surface positioned opposite to the light discharge surface;
   a light incident surface intersecting with the light discharge surface and the light diffusing surface;
   a first side surface, a second side surface, and a third side surface, wherein the first side surface, the second side surface, and the third side surface intersect the light discharge surface and the light diffusing surface, and the first side surface and the third side surface intersect with the light incident surface;
   a plurality of scattering dots disposed on the light diffusing surface, and dividing the light diffusing surface into a first part and a second part, wherein the first part is disposed between the light incident surface and the second part; the scattering dots in the first part are arranged in the form of a plurality of concentric arcs; the scattering dots in the second part are arranged in the form of a plurality of lines substantially parallel with the second side surface;
   the light source is located beside the light incident surface of the light guide plate.

* * * * *